(12) United States Patent
Tiemann

(10) Patent No.: US 10,618,028 B2
(45) Date of Patent: Apr. 14, 2020

(54) PROX REACTOR AND FUEL CELL ARRANGEMENT COMPRISING PROX REACTOR

(71) Applicant: DIEHL AEROSPACE GMBH, Ueberlingen (DE)

(72) Inventor: David Tiemann, Gau-Odernheim (DE)

(73) Assignee: DIEHL AEROSPACE GMBH, Ueberlingen (DE)

( * ) Notice: Subject to any disclaimer, the term of this patent is extended or adjusted under 35 U.S.C. 154(b) by 107 days.

(21) Appl. No.: 15/899,640

(22) Filed: Feb. 20, 2018

(65) Prior Publication Data

US 2018/0236429 A1 Aug. 23, 2018

(30) Foreign Application Priority Data

Feb. 20, 2017 (DE) .................. 10 2017 001 563

(51) Int. Cl.
| | | |
|---|---|---|
| *H01M 8/0612* | (2016.01) | |
| *B01J 19/24* | (2006.01) | |
| *H01M 8/0668* | (2016.01) | |
| *B01J 12/00* | (2006.01) | |
| *C01B 3/58* | (2006.01) | |

(52) U.S. Cl.
CPC ........... *B01J 19/249* (2013.01); *B01J 12/007* (2013.01); *C01B 3/583* (2013.01); *H01M 8/0618* (2013.01); *H01M 8/0631* (2013.01); *H01M 8/0668* (2013.01); *B01J 2219/2459* (2013.01); *B01J 2219/2498* (2013.01); *C01B 2203/025* (2013.01); *C01B 2203/0261* (2013.01); *C01B 2203/0283* (2013.01); *C01B 2203/066* (2013.01); *C01B 2203/067* (2013.01); *C01B 2203/1217* (2013.01)

(58) Field of Classification Search
CPC ...... C01B 2203/025; C01B 2203/0261; C01B 2203/0283; C01B 2203/066; C01B 2203/067; C01B 2203/1217; C01B 3/583; H01M 8/0618; H01M 8/0631; H01M 8/0668
See application file for complete search history.

(56) References Cited

U.S. PATENT DOCUMENTS

| 5,874,051 A | 2/1999 | Heil et al. |
|---|---|---|
| 6,132,689 A | 10/2000 | Skala et al. |
| 2003/0200699 A1 | 10/2003 | Robb |

(Continued)

FOREIGN PATENT DOCUMENTS

| EP | 0776861 A1 | 6/1997 | |
|---|---|---|---|
| WO | WO-2007045457 A1 * | 4/2007 | ............ B01F 5/0453 |

*Primary Examiner* — Stewart A Fraser
*Assistant Examiner* — Victoria H Lynch
(74) *Attorney, Agent, or Firm* — Scully Scott Murphy and Presser

(57) ABSTRACT

The invention relates to a PrOx reactor (R) comprising a housing that encloses a reaction space and has a first inlet (E1) for supply of a hydrogenous first gas (G1) to a reaction space, a second inlet (E2) for supply of an oxygenous second gas (G2) to the reaction space and an outlet (A) for discharge of a third gas (G3), wherein there is a multitude of conduits (Kv) extending from the second inlet (E2) into the reaction space, each of which comprises at least one opening (O) for supply of the second gas (G2) to the reaction space.

12 Claims, 4 Drawing Sheets

(56) References Cited

U.S. PATENT DOCUMENTS

Figure 1:
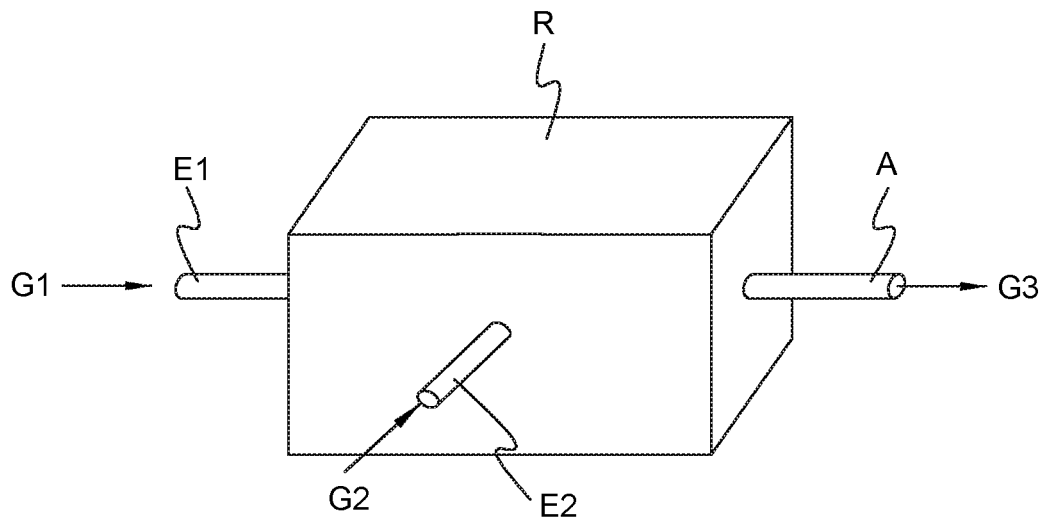

2008/0166277 A1\* 7/2008 Son .................... B01D 53/864
                                                422/198
2013/0065143 A1\* 3/2013 Knepple .................. C01B 3/32
                                                 429/423

\* cited by examiner

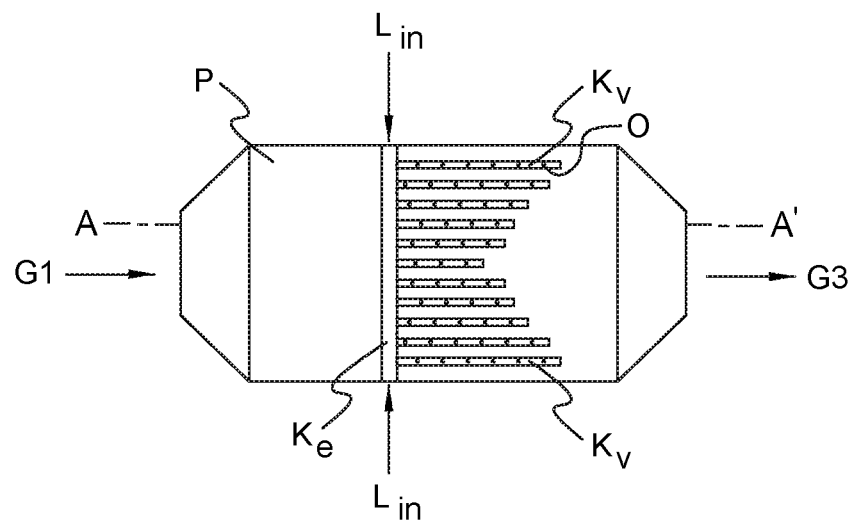
FIG. 4
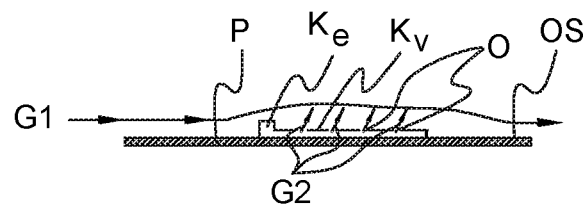
FIG. 5
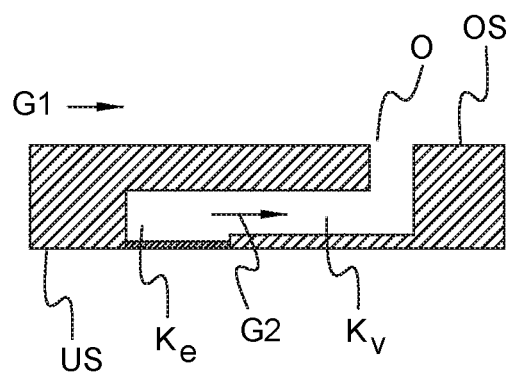 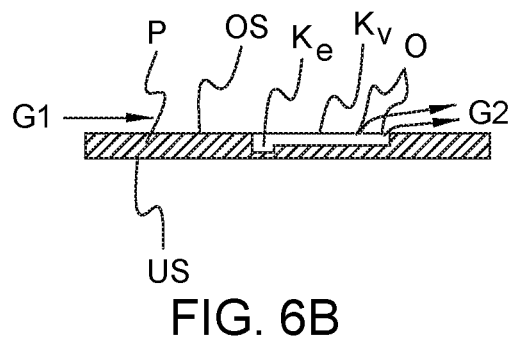
FIG. 6A	FIG. 6B

PROX REACTOR AND FUEL CELL ARRANGEMENT COMPRISING PROX REACTOR

The invention relates to a PrOx reactor and to a fuel cell arrangement comprising the PrOx reactor.

According to prior art, reactors for generation of hydrogen from hydrocarbons are used in a fuel cell system. One of these reactors is a reactor for preferential oxidation of carbon monoxide or what is called a PrOx reactor. In a reactor of this kind, carbon monoxide in the reformer gas is preferably oxidized by single-stage addition of an oxygenous gas. The oxygenous gas may especially be air. In practice, the oxidation of the carbon monoxide in the reformer gas is incomplete.

US 2003/0200699 A1 discloses an autothermal reformer comprising a first stage which selectively receives a fuel flow, a first oxidant flow and a steam flow. The first stage has a first portion of a catalyst bed. Within the first stage, the fluids are guided through the first portion of the catalyst bed and react. There is a second stage downstream of and communicating with the first stage. The second stage receives the fluids from the first stage and also selectively receives a second oxidant flow. The second oxidant flow and the fluids received from the first stage flow through a second portion of a catalyst bed and react further.

U.S. Pat. No. 6,132,689 discloses a multistage, isothermal carbon monoxide preferential oxidation reactor (PrOx reactor) comprising a multitude of catalysed heat exchangers arranged in series, which are each separated from one another by a mixing chamber that serves to homogenize the gases that leave one heat exchanger and enter the next. In a preferred embodiment, at least a portion of the air used in the PrOx reaction is fed directly into the mixing chamber between the catalysed heat exchangers.

EP 0 776 861 A1 discloses a process of this kind, in which the gas mixture and an additionally supplied oxidizing gas are passed through a reactor containing the catalyst material. It is proposed that the oxidizing gas be introduced at multiple points along the flow pathway of the gas mixture, in each case at a flow rate under open-loop or closed-loop control. It is also proposed that the gas mixture stream be passively cooled by means of static mixer structures arranged in the entry region of the CO oxidation reactor. This way of influencing the exothermic CO oxidation in a controlled manner along the reaction pathway permits a very variable process regime adaptable to the particular situation. One use takes place, for example, in the recovery of hydrogen by methanol reforming for fuel cell-operated motor vehicles.

It is an object of the invention to eliminate the disadvantages according to the prior art. More particularly, a PrOx reactor having improved efficiency is to be specified.

The object is achieved by the features of claim 1. Preferred configurations of the invention will be apparent from the features of claims 2 to 13.

In accordance with the invention, a PrOx reactor is proposed, comprising a housing that surrounds a reaction space and has a first inlet for supply of a hydrogenous first gas to the reaction space, a second inlet for supply of an oxygenous second gas to the reaction space and an outlet for discharge of a third gas, wherein there is a multitude of conduits extending from the second inlet into the reaction space, each of which comprises at least one opening for supply of the second gas to the reaction space.

A "reactor" in the context of the present invention is understood to mean a unit with which substances supplied, for example hydrocarbons, are converted to a further substance under the action of temperature and/or pressure and/or auxiliaries, such as catalysts.

The substance may be a substance mixture, especially a gas. For conversion of the substance in the reactor, it is typically necessary to expend or remove energy.

In the context of the present invention, "PrOx" is understood to mean "preferential oxidation", i.e. the preferential oxidation of a gas.

The hydrogenous first gas preferably comprises a proportion of carbon monoxide (CO). The hydrogenous first gas may optionally comprise a proportion of the second gas, in which case the proportion of the second gas is smaller than the proportion necessary for full reaction.

In the PrOx reactor, CO is converted to $CO_2$ by means of a catalyst and hence made utilizable to downstream reactors, especially the fuel cell. The hydrogenous first gas is preferably generated in a multitude of upstream reactors. It can be converted, for example, from a propylene glycol/water mixture in what is called a reformer with addition of air to a further hydrogenous gas having proportions of carbon monoxide, carbon dioxide, water and nitrogen. From this gas, a portion of the carbon monoxide is converted in an intermediately connected water-gas shift reactor with addition of water to carbon dioxide and hydrogen. It is optionally possible to add a proportion of second gas to the gas generated in the water-gas shift reactor even before it is introduced into the PrOx reactor.

A second gas introduced into the reaction space for preferential oxidation is an oxygenous gas, especially air. By virtue of the conduits envisaged in accordance with the invention, the second gas is not mixed with the first gas, or is not just mixed with the first gas locally in the vicinity of the first inlet. When the first gas already comprises a proportion of the second gas, the conduits especially serve to supply the further proportion of the second gas to the reaction space. The first gas flows essentially from the first inlet in the direction toward the outlet. The conduits that extend from the second inlet into the reaction space result in supply of the second gas with a distribution in time and space to the reaction proceeding in the reaction space, such that, for example, a greater proportion of carbon monoxide can be oxidized to carbon dioxide. This improves the efficiency of the PrOx reactor.

In one configuration, the housing comprises a third inlet for supply of a proportion of the oxygenous second gas. The third inlet is especially arranged alongside the first inlet, such that the first gas can be supplied by the first inlet and a proportion of the second gas by the third inlet. In this configuration, the first gas does not comprise any proportion of second gas.

In a preferred configuration, each conduit comprises a multitude of openings. The multitude of openings increases the spatial distribution of the addition of the second gas.

Appropriately, the first inlet and the outlet are arranged on opposite sides of the housing, such that a flow direction of the first gas from the first inlet to the outlet forms a first direction.

In an appropriate configuration, the PrOx reactor comprises a multitude of plates stacked one on top of another, which have preferably been provided with superficial microstructuring, such that a flow passes through a cavity formed between the plates in the first direction. The reaction space is divided into a multitude of reaction regions by the microstructuring. The provision of a multitude of reaction regions improves the mixing and hence the completeness of the reaction. In addition, this increases the surface area of the reactor, such that heat can be more effectively supplied or removed. The microstructuring may be introduced, for example, by forming, embossing, rolling or etching of patterns, for example in the form of grooves, herringbone patterns etc. The plates may especially have been provided with grooves, such that a multitude of channels through which a flow passes in a first direction is formed between the plates.

Appropriately, the conduits have been integrated into the plates. The conduits can be integrated into the plates through microstructuring of the plates.

According to the invention, the length and cross section of the conduits are designed such that a pressure drop between the second inlet and the end of the respective conduit is essentially equal. As a result, the second gas is guided into the reaction space homogeneously and at the same pressure, and appropriately also with uniform flow rate.

In a preferred embodiment, there is an input conduit connected between the conduits and the second inlet. Appropriately, the pressure drop from an intake of the input conduit up to the end of the respective conduit is essentially equal. The conduits preferably extend parallel to the first direction, and the input conduit extends at right angles to the first direction. Appropriately, a length of the conduits extending from the input conduit decreases with increasing distance from the second inlet. By the above-described measures, it is possible to distribute air introduced as the second gas, for example, homogeneously in the reaction zone and hence to minimize, for example, the carbon monoxide content of the third gas at the outlet of the reactor.

In an advantageous configuration, the conduits have an essentially identical cross section.

Further proposed in accordance with the invention is a fuel cell arrangement comprising at least a reformer, a PrOx reactor according to the invention and a fuel cell, wherein the PrOx reactor is arranged downstream of the reformer and upstream of the fuel cell. The fuel cell arrangement especially comprises a series connection of an evaporator, the reformer, a water-gas shift reactor, the PrOx reactor and the fuel cell. It may comprise additional units, such as heat exchangers.

Appropriately, the fuel cell arrangement is designed for operation with a propylene glycol/water mixture, which is converted to the gas phase by means of an evaporator and supplied to the reformer.

Figure 2:
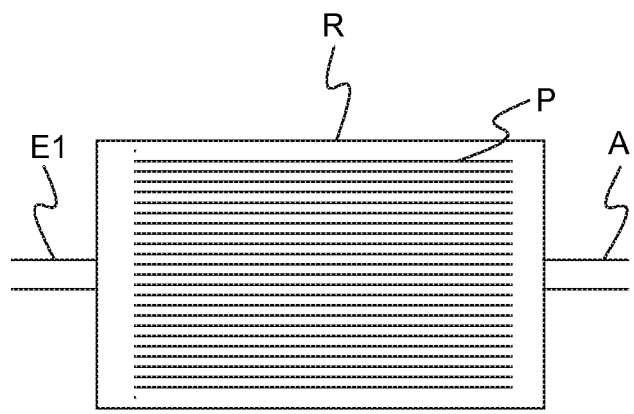
Figure 3:
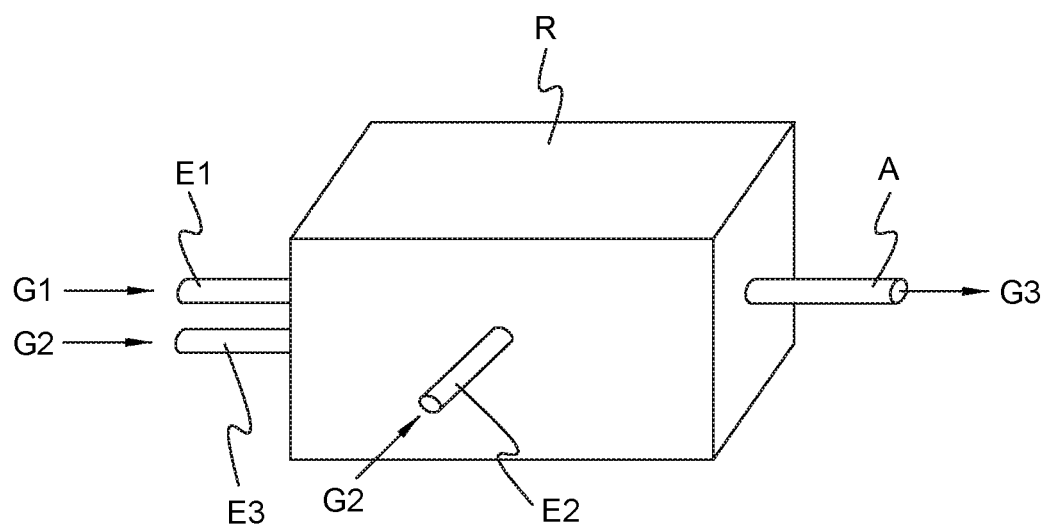
Figure 7:
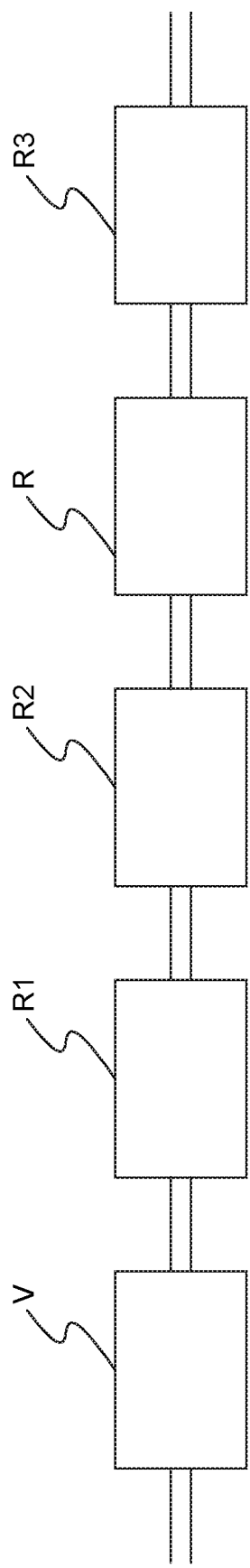

The invention is illustrated hereinafter by drawings. The figures show:

FIG. 1 a schematic drawing of a PrOx reactor according to the invention,

FIG. 2 a cross section of a PrOx reactor with a stack of plates,

FIG. 3 a schematic drawing of a further PrOx reactor according to the invention, FIG. 4 a schematic diagram of a plate with microstructuring for use in the reactor, FIG. 5 a cross section through a plate with conduit and input conduit along the section line A-A' according to FIG. 4, FIG. 6*a* a configuration of a cross section through a plate, FIG. 6*b* a further configuration of a cross section through a plate and FIG. 7 a fuel cell arrangement according to the invention.

FIG. 1 shows a PrOx reactor R. The PrOx reactor R comprises a housing having a first inlet E1 and a second inlet E2. A first gas G1 is introduced into the reaction space through the first inlet E1 and flows from the inlet E1 in the direction toward the outlet A. The first gas G1 may comprise a proportion of a second gas G2. The second gas G2 or a further proportion of the second gas G2 is introduced through the second inlet E2 into the PrOx reactor R. This second gas G2 mixes with the first gas G1 in the reaction space of the reactor R, where it reacts. Reacted and any unreacted proportions of the first G1 and second gas G2 form the third gas G3. The third gas G3 flows to the outlet A, where it leaves the PrOx reactor R. The first inlet E1 and the second inlet E2 may be arranged on the same side of the reactor housing, especially opposite the outlet A (not shown). They may also be arranged on two different sides of the reactor housing. In the case shown, a further second inlet E2 is arranged, for example, on a side opposite the second inlet E2.

Appropriately, there is a multitude of plates P in the PrOx reactor R shown in FIG. 1. These plates P are arranged flat one on top of another, such that gas can flow from the first inlet E1 to the outlet A along the plates P. The arrangement of the plates P one on top of another in the housing of the PrOx reactor R is shown in FIG. 2.

FIG. 3 shows a further configuration of the PrOx reactor R with a third inlet E3 arranged alongside the first inlet E1. A proportion of the second gas G2 is introduced through the third inlet E3, such that the first gas G1, which appropriately does not comprise any second gas G2 here, is mixed with the proportion of the second gas G2 in the entry region of the PrOx reactor R. A further proportion of the second gas G2 is introduced via the second inlet E2 into the PrOx reactor R.

The first gas G1 passes over the plate P shown in schematic form in FIG. 4 in arrow direction, i.e. in a first direction. Shown at right angles to the flow direction of the first gas G1 is an input conduit Ke into which, in particular, air $L_{in}$ can flow through the second inlet E2 from one side or, in the case shown, from both sides of the plate P. The input conduit Ke is connected to a multitude of conduits Kv which appropriately extend in flow direction, i.e. the first direction. The second gas G2 flowing into the input conduit Ke is conducted onward through the conduits Kv. Each of the conduits Kv comprises at least one opening in the region of the free end of the conduits Kv, which is directed away from the input conduit Ke, for discharge of the second gas G2, for example the air, into the reaction space. The conduits Kv may comprise a multitude of openings O as channel exits. There is appropriately a multitude of openings O on a side remote from the plate P, such that the flow direction of the gas exiting through the openings O intersects with the flow direction of the gas flowing over, resulting in good mixing of the gases. In the configuration shown, the conduits Kv in the edge region of the plate P are longer than in the middle region of the plate P, such that a pressure drop from the intake of the input conduit Ke up to the end of the respective conduit Kv is of the same magnitude by virtue of an essentially equal length.

FIG. 5 shows a cross section along the section line A-A' through the plate P according to FIG. 4. The arrow shows the flow direction of the first gas G1. The input conduit Ke runs at right angles to the plane of the drawing. This appropriately has a greater cross section than the conduit Kv. A cross section through the conduit Kv is shown in the plane of the drawing. The input conduit Ke and the conduit Kv are mounted on the plate P in the execution shown. The conduit Kv here has four openings O. The second gas G2 flows firstly through the input conduit Ke and then through the conduit Kv that branches off from it. In the case shown, the second gas G2 exits through the openings O and mixes with the first gas G1. In the case shown, the second gas G2 flows at least partly at right angles to the flow direction of the first gas G1, such that there is good mixing of the first G1 and second gas G2. Alternatively or additionally, the conduit Kv may have an opening O at the end of the conduit Kv (not shown). To improve the effectiveness, multiple plates P of this kind may be provided in a stacked arrangement in a reactor, if necessary with intermediate provision of spacers or intermediate plates.

FIG. 6a shows one configuration of a cross section of a plate P. The configuration shows an input conduit Ke integrated from a lower side US, and a conduit Kv having an opening O on an upper side OS of the plate P opposite the lower side US. The conduit Kv especially has a gastight boundary, for example in the form of a film, on the lower side US of the plate P. The first gas G1 flows along the upper side OS and the second gas G2 flows through the input conduit Ke and the conduits Kv. The plate P may be arranged between two further plates spaced apart from one another, which especially have a smooth surface facing the plate P. Multiple plates P may be arranged in a stack with further plates.

FIG. 6b shows a further configuration of a cross section of a plate P, in which the input conduit Ke and the conduit Kv are integrated into the plate P such that the upper side OS of the plate P is essentially flat and the openings O of the conduit Kv are executed as openings O in the upper side OS of the plate P. The second gas G2 passes through the openings O and mixes and reacts with the first gas G1 flowing past.

FIG. 7 shows a fuel cell arrangement comprising the PrOx reactor R. In the configuration shown, the fuel cell arrangement comprises an evaporator V, a reformer R1, a water-gas shift reactor R2, the PrOx reactor R and a fuel cell R3 for generation of electrical current. The fuel cell arrangement is especially envisaged for operation with propylene glycol. In this case, propylene glycol is mixed with water and evaporated in the evaporator V. The vapour thus obtained is introduced into the reformer R1 and reformed with addition of air $L_{in}$ through a further inlet. The reformer gas thus produced is converted in two stages in the water-gas shift reactor R2 with addition of steam and in the downstream PrOx reactor R with addition of air $L_{in}$ as second gas G2 to a very substantially carbon monoxide-free gas. The very substantially carbon monoxide-free gas is introduced into the fuel cell R3.

With the aid of heat exchangers (not shown), the waste heat formed in exothermic reactions can be removed, for example from the PrOx reactor R, and used in the evaporators V.

LIST OF REFERENCE SYMBOLS

A outlet
E1 first inlet
E2 second inlet
E3 third inlet
G1 first gas
G2 second gas
G3 third gas
Ke input conduit
Kv conduit
$L_{in}$ air
O opening
OS upper side
P plate
R PrOx reactor
R1 reformer
R2 water-gas shift reactor
R3 fuel cell
US lower side
V evaporator

The invention claimed is:

1. A PrOx reactor (R) comprising a housing that surrounds a reaction space and has a first inlet (E1) for supply of a hydrogenous first gas (G1) to the reaction space, a second inlet (E2) for supply of an oxygenous second gas (G2) to the reaction space and an outlet (A) for discharge of a third gas (G3),
wherein there is a multitude of conduits (Kv) extending from the second inlet (E2) into the reaction space, each of which comprises at least one opening (0) for supply of the second gas (G2) to the reaction space,
wherein a length and cross section of the multitude of conduits (Kv) are designed such that a pressure drop between the second inlet (E2) and an end of a respective conduit (Kv) is essentially equal, and
wherein the PrOx reactor (R) comprises a multitude of plates (P) stacked one on top of another, which have been provided with superficial microstructuring, such that it is possible for flow to pass through a cavity formed between the multitude of plates (P) in a first direction.

2. The PrOx reactor (R) according to claim 1, wherein the housing comprises a third inlet (E3) for supply of a proportion of the oxygenous second gas (G2).

3. The PrOx reactor (R) according to claim 1, wherein each conduit (Kv) comprises a multitude of openings (0).

4. The PrOx reactor (R) according to claim 1, wherein the first inlet (E1) and the outlet (A) are arranged on opposite sides of the housing, such that a flow direction of the first gas (G1) from the first inlet (E1) to the outlet (A) forms a first direction.

5. The PrOx reactor (R) according to claim 1, wherein the multitude of plates (P) have been provided with grooves, such that a multitude of channels through which flow is possible in the first direction are formed between the multitude of plates (P).

6. The PrOx reactor (R) according to claim 1, wherein the multitude of conduits (Kv) have been integrated into the multitude of plates (P).

7. The PrOx reactor (R) according to claim 1, wherein an input conduit (Ke) has been connected between the multitude of conduits (Kv) and the second inlet (E2).

8. The PrOx reactor (R) according to claim 7, wherein the multitude of conduits (Kv) extend parallel to a first direction and the input conduit (Ke) extends at right angles to the first direction.

9. The PrOx reactor (R) according to claim 8, wherein a length of the multitude of conduits (Kv) that extend from the input conduit (Ke) decreases with increasing distance from the second inlet (E2).

10. The PrOx reactor (R) according to claim 8, wherein the multitude of conduits (Kv) have an essentially equal cross section.

11. A fuel cell arrangement comprising at least a reformer (R1), a PrOx reactor (R) according to claim 1 and a fuel cell (R3),
wherein the PrOx reactor (R) is arranged downstream of the reformer (R1) and upstream of the fuel cell (R3).

12. The fuel cell arrangement according to claim 11, designed for operation with a propylene glycol/water mixture which is converted to the gas phase by means of an evaporator (V) and supplied to the reformer (R1).

* * * * *